United States Patent Office 3,551,397
Patented Dec. 29, 1970

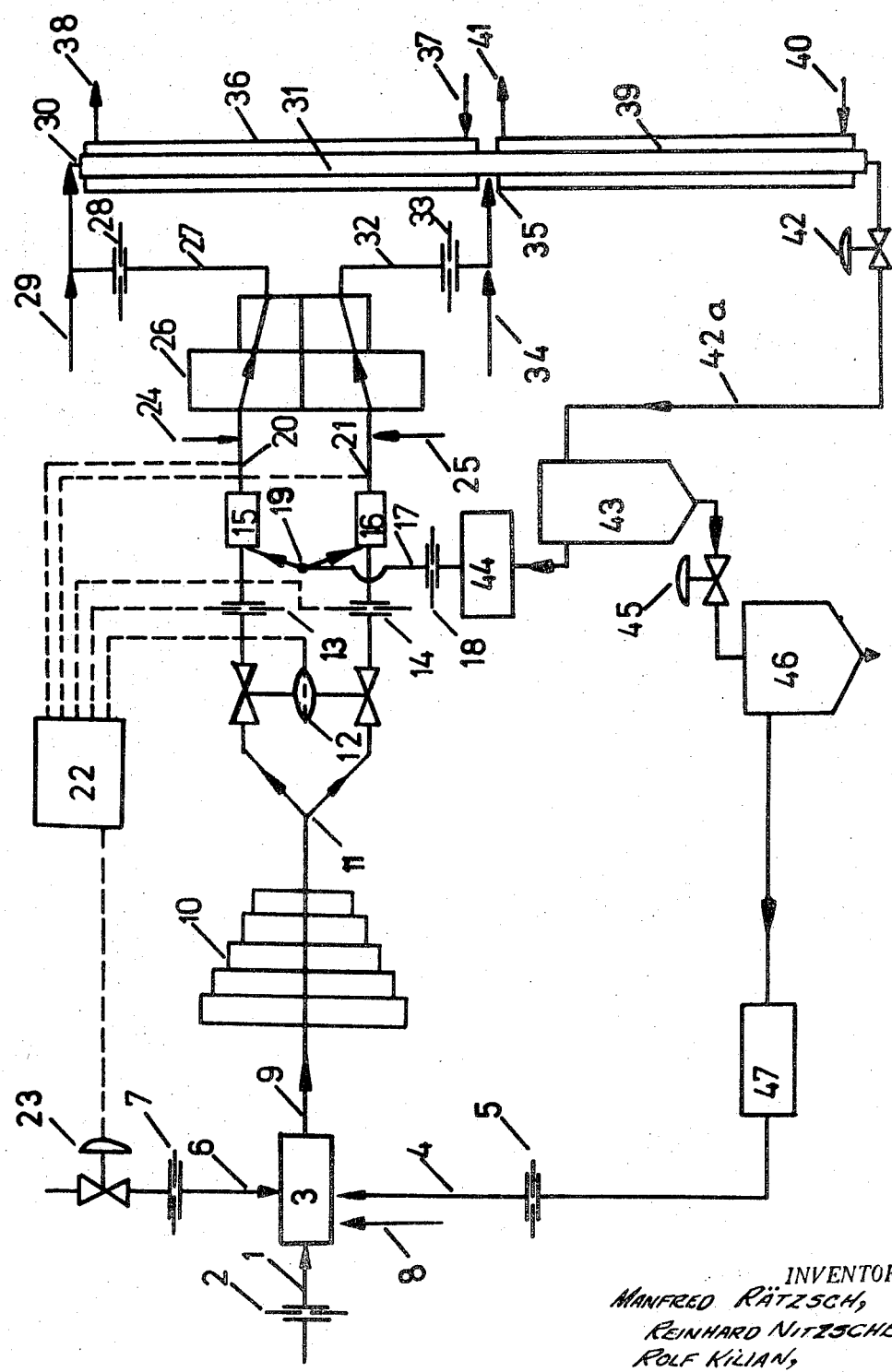

3,551,397
PROCESS FOR POLYMERIZATION OF ETHYLENE
Manfred Rätzsch and Reinhard Nitzsche, Leuna, Rolf Kilian, Bad Durrenberg, Klaus-Dieter Ebster, Leuna, and Arnulf Ulrich, Bad Durrenberg, Germany, assignors to VEB Leuna-Werke "Walter Ulbricht," Leuna, Germany
Filed Oct. 23, 1967, Ser. No. 718,273
Int. Cl. C08f 1/60, 3/04
U.S. Cl. 260—86.7                     8 Claims

ABSTRACT OF THE DISCLOSURE

A process for making ethylene polymers and copolymers with other polymerizable compounds in tubular reactors at pressures above 1300 atm. and temperatures between 100 and 350° C. in the presence of oxygen as radical-forming initiator, if desired with addition of other coreactants and other initiators, wherein reaction gas is introduced at two different points, one at the inlet and the other at some other point along the reactor, by dividing the fresh ethylene gas containing oxygen and, if desired said other reactants, at a pressure of 100–400 atmospheres into two streams, which are made into reacting gas streams by additional re-cycled residual reaction gas, compressing the two reacting gas streams to at least 1300 atm., introducing one of the reacting gas streams at the inlet to the reactor and the other at a point along the reactor, whereby the distribution of the oxygen-containing, and sometimes coreactants containing, fresh ethylene is so effected that at the inlet of the reactor and directly behind the second introduction of gas into the reactor, the concentration of oxygen in the reactor will be 0.0005 to 0.5% by weight, and that of coreactant, if present, 0.1–60% by weight.

---

It is known to polymerize ethylene at pressures above 500 atm. and temperatures of 50–400° C. in the presence of small amounts of radical-forming initiators and, if desired, in the presence of other coreactants in tubular reactors in order to obtain thermoplastic ethylene homopolymers or copolymers. (German Pat. 863,547, U.S. 2,405,962, and Brit. 580,182.)

It is further known to polymerize ethylene under high pressure in tubular reactors and to add a radical-forming initiator in measured amounts at least at one point along the reactor, whereby the temperature of the added ethylene-initiator mixture is below that of the reaction mixture at the given point. (Brit. Pat. 934,444.)

According to another known process (Brit. Pat. 915,-240), ethylene is polymerized in a tubular reactor having a diameter:length ratio of at least 1:250, the polymerization being carried out in the presence of a radical-forming initiator and, if desired, a chain-transfer agent and/or a copolymerizable compound, whereby two or more streams of gas are added, one at the reactor inlet and the other or the others at points along the reactor, the distance between the points of addition being so chosen that it will amount to 15 to 85% of the distance between first addition and discharge of polymer formed from the last reaction zone. By the term "reaction zones" is meant the spaces between the individual points of addition or that space between the last point of addition and the discharge of the polymer. In this case the ratio of the diameter:length of the reactor may be 1:40,000.

The above mentioned processes have the shortcoming that variable conditions of operation can only be realized if the addition of initiator occurs under reaction pressure. When oxygen is used as initiator, which is compressed together with pure ethylene, from the low-pressure part of the plant, there will be an equal concentration in the reaction gas at the start and in the reaction gas before further additions are made to the reactor. In that case the oxygen concentration in the reaction mixture directly after the renewed reaction gas additions will be substantially lower than the concentration at the reactor inlet. A control of the oxygen concentration in the several reaction zones is not possible in that case. In that manner no variation of the process and no control of the viscosity of the products can be effected. Nor is it possible to influence the concentration of the ethylene or of the chain transfer agents in the reaction mixture in the several reaction zones, so that the ethylene concentration steadily drops in the several zones and the concentration of the chain transfer agents as well as of the inert gas will proportionately rise in the different zones. The decrease in ethylene concentration and the increase in chain transfer agent in the second part of the reactor will automatically lead to undesirable changes in the quality of the product.

When, instead of oxygen, other initiators are used, it will cause in most cases an increase in production costs due to more expensive equipment needed. Moreover, other initiators require the use of a solvent, which will partly be present in the final product, thereby impairing its quality to a considerable extent. In order to avoid the above mentioned drawbacks some other processes have been developed.

One process is, for instance, known in which ethylene is polymerized in a tube reactor whereby initiators are added, preferably oxygen, which is dissolved in an oxygen absorbing liquid, said addition taking place not only at the reactor inlet, but also at different points along the reactor. In that manner, a satisfactory control of the reaction conditions can be achieved. (Brit. Pat. 583,865.)

In another known process (Brit. Pat. 965,738, DAS 1,208,074), ethylene-initiator mixture is added in measured amounts at different points whereby oxygen, preferably in solution, is added to the ethylene which is introduced in such a manner that the oxygen concentration of the combined gas streams at the point of addition to the reactor will be at least $0.5 \cdot 10^{-3}$ mol percent, preferably $1 \cdot 10^{-3}$ to $10^{-2}$ mol percent, and the velocity of the reaction mixture in the reactor at least 2.5 m./sec.

In our co-pending application Ser. No. 610,463, filed Jan. 20, 1967, the initiator is added to the reaction mixture at a point different from and ahead of that one where ethylene is added. By this process high yields combined with a good quality of the product are achieved.

It is true that the last mentioned processes permit a definite measured addition of oxygen as initiator at different points of the reactor; however they do not eliminate the disadvantage that for the introduction of the initiator high-pressure pumps have to be used and, furthermore, solvents are entrained into the reactor.

It is therefore the object of the invention to provide a process which makes it possible to avoid all the above mentioned drawbacks and shortcomings of processes mentioned above.

It is another object of the invention to provide a process which permits, by the use of simple means, to introduce oxygen as initiator in defined amounts at two points into the reactor, together with the ethylene, without the use of measuring pumps or of solvents for the initiator.

Other objects and advantages of the process according to the invention will become apparent from the following detailed description and the accompanying drawing.

According to the invention the above objects are accomplished by carrying out the process for making ethylene polymers and copolymers with other polymerizable compounds in tubular reactors at pressures above 1300 atm. and temperatures between 100 and 350° C. in the presence of oxygen as radical-forming initiator, if desired with addition of other coreactants and other radical-forming initiators, wherein reaction gas is introduced at two different points, one at the inlet and the other at some other point along the reactor, by dividing the fresh ethylene gas containing oxygen and, if desired said other reactants at a pressure of 100–400 atmospheres into two streams, which are made into reacting gas streams by additional re-cycled residual reaction gas, compressing the two reacting gas streams to at least 1300 atm., introducing one of the reacting gas streams at the inlet to the reactor and the other at a point along the reactor, whereby the distribution of the oxygen containing and sometimes coreactants containing fresh ethylene is so effected that at the inlet of the reactor and directly behind the second introduction of gas into the reactor, the concentration of oxygen in the reaction gas mixture will be 0.0005 to 0.5% by weight, and that of coreactant, if present, 0.1–60% by weight.

By using the process according to the invention, it is made possible, by simple means, to adjust the concentration of oxygen at the reactor inlet and immediately behind the second addition in a manner required; furthermore, it is possible to obtain a more even curve of concentration of the compounds becoming more concentrated in the reaction gas in the reactor, than it was hitherto possible according to known processes.

The fresh ethylene is divided into two streams of usually different amount and thus different content in oxygen, at a pressure ranging from 100–400 atm. The quantities of reaction gas streams are determined by the delivery output of the compressors used for compressing the gas to reaction pressure. When a compressor is used having at least two cylinders in each stage, as well as when using two compressors, it is customary to make the quantities of reaction gas streams approximately equal. When for instance different quantities of the two fresh ethylene streams are used and equal quantities of the reaction gas streams, the amount of residual gas passed into the fresh ethylene streams will automatically be different. In general it will be advantageous to add the second reaction gas stream at a point of the reactor, where the oxygen admitted with the reaction gas at the inlet of the reactor, will have been already consumed. Therefore, the amount of the second fresh ethylene stream will be made about twice the amount of the first stream, in order to adjust the oxygen concentration in the second reaction gas stream twice as high as in the first one thus making the oxygen concentration at the inlet of the reactor and immediately behind the second reaction gas admission approximately equal.

In the indicated manner it is also possible to vary without difficulty the oxygen concentration at the inlet of the reactor and directly behind the second admission according to necessities of the course of the reaction, whereby in addition to the control of the admitted fresh ethylene streams there is the regulation of the oxygen amount added to the fresh ethylene at lower pressure.

The best point for adding the second amount of reaction gas is, as known per se, at 15–85% of the total distance between inlet and discharge ends of the reactor. When the second addition occurs at points beyond these limits, no optimum yields are obtainable.

In some cases, e.g. where copolymers are to be made with such monomers which have a high polymerization rate as compared to ethylene, or polymers of high density are to be made, it is desirable to add to the separate reaction gas streams different amounts of coreactants before compression to the reaction pressure occurs and to bring the mixture of coreactants and ethylene together to reaction pressure.

As coreactants we may add comonomers and/or solvents and/or control agents such as chain transfer agents, agents causing linearization and/or agents cutting off chain formation. Suitable coreactants are comonomers, e.g. vinyl esters, acrylic esters and acrylic acid, and/or solvents such as benzene, and/or control agents, such as hydrogen, olefins, paraffins, chlorinated hydrocarbons, alcohols, aldehydes or ketones.

For some types of products, for instance such of higher density, it is advantageous to add further initiators to the reaction gas streams before they enter the reactor. Such initiators are primarily peroxide compounds, such as di-tert.butyl peroxide, di-benzoylperoxide, di-lauroyl peroxide, isovaleroyl peroxide, tert.-butylperbonzoate and hydrogen peroxide. Furthermore azo-compounds, e.g. azo-bisisobutyronitrile and 2,2′-di-cyanoazobenzene.

The diameters of the two reaction zones are preferably so chosen that approximately equal rates of flow of the reaction mixtures occur in the two zones. However, it is also possible to use a tube with equal diameter throughout. It is further possible to use a tubular reactor with remixing, thus a mixing reactor, or two mixing reactors in series arrangement.

It is preferable to use for the compression of the reaction mixture from 100–400 atm. to the reaction pressure, a single compressor, but with at least two cylinders per pressure stage; this is more advantageous than to use two compressors, each having only half the output.

By using the process according to the invention, it is possible to carry out a variable high-pressure polyethylene process with a simple quantity control readily practicable by any person skilled in the art the pressure being 100–400 atmospheres; the course of the reaction is easy to control and yields are at an optimum, with oxygen serving as initiator. No initiator measuring pumps are required in the process, and only one compressor is needed for the compression of fresh ethylene to the pressure of 100–400 atmospheres and another one to perform compression to the reaction pressure. The products obtained are of finest qualities with particular excellency of the properties of foils.

Reference is made in the following to a flow sheet, the single figure of which illustrates the process according to the invention.

In the flow sheet, 1 designates a pipe line for the admission of pure ethylene from an outside source (not shown). 2 is a measuring means for the admitted ethylene and 3 is a mixing vessel. In addition to the pure ethylene, the mixing vessel receives effluent ethylene by a pipe 4 over a measuring means 5, oxygen by a line 6, over a measuring means 7, and if desired, a chain regulating agent by a line 8. In the mixing vessel 3 these ingredients are mixed to what is called "fresh ethylene" which is the starting material for the polymerization. For the passage of this fresh ethylene, a line 9 is provided leading to a compressor 10, where compression takes place to 100–400 atm. A branching means 11 is arranged in series with the compressor 10, and this means 11 serves for dividing up the fresh ethylene into two separate streams, the amounts of which are regulated by a double valve 12.

The plant is further equipped with two mixing vessels 15 and 16, where the two ethylene streams are respectively received after having passed measuring means 13 and 14, respectively. In vessels 15 and 16 the fresh ethylene is mixed with residual reaction gas which is the unreacted portion of the gas remaining after polymerization of the main amount has taken place. The unreacted gas is recycled at intermediate pressure over a line 17, a measuring means 18, and arrives at a fork 19, where it is divided into two partial streams joining the fresh ethylene in mixing vessels 15 and 16. After reaction gas formation has taken place in the mixing vessels, the streams leave these vessels and arrive at oxygen analysis stations 20 and 21, respectively, where the oxygen contents is measured.

For the control of the oxygen contents, a central regulating device 22 is provided which has two functions. It controls the double valve 12 when the oxygen amount found by analysis at 20 and 21 deviates from a desired value and it further controls the amount of oxygen delivered to the mixer 3 over line 6, by action on a valve 23. If desired, coreactants can be introduced after the oxygen contents has been analyzed at stations 20 and 21, from lines 24 and 25, respectively, which are provided for the purpose of admitting such reactants from sources not shown.

A second compressor, designated by 26, is provided for compression of the reaction gas streams to reaction pressure. The compression is carried out in separate compartments. One of the compressed gas streams is passed over a line 27, adapted to being heated, over measuring means 28 to the inlet 30 of the reaction tube 31. A line 29 likewise leading to the inlet 30, is provided for the introduction of initiator.

The second reaction gas stream is admitted over a line 32, also adapted to being heated, and a measuring device 33 to a point 35 intermediate the two ends of the reaction tube 31; a line 34 is provided for initiator admission.

The dimensions of the reaction tube, its length and diameter, etc. as well as the site of point 35, are given in the examples following the description of the flow sheet.

The reaction tube 31 is provided with a jacket the first part of which, designated by 36, is provided with a hot water supply pipe 37 and water discharge pipe 38 and this part encloses the first reaction zone. The hot water is maintained in circulation through the jacket 36. The second part of the tube 31 is enclosed in a jacket 39 with admission pipe 40 and discharge pipe 41 for hot water. A discharge pipe 42a including a pressure maintaining valve 42 receives the reaction mass from tube 31 at the discharge end thereof and conveys it to a first separator 43, where at a pressure of 100–400 atm. the polymer formed is separated from uncoverted gas, called residual reaction gas. The latter is returned into the polymerization system over a gas-purification and cooling device 44.

The polymer is passed over a pressure relief valve 45 from the first to a second separator 46, where at low pressure ethylene still contained in the polymer, is set free. This effluent ethylene returns over a gas purification and cooling device 47 into the system over line 4.

In the following, the invention will be more fully described in a number of examples, which are given by way of illustration and not of limitation. Many changes in the details can be made without departing from the spirit of the invention.

In the examples, all parts are given by weight or percent by weight. The parts of the apparatus mentioned are those described with reference to the accompanying flow sheet.

EXAMPLE 1

Into the first zone of a reaction tube 31 provided with a jacket, we introduced 3150 parts of ethylene and 0.075 part of oxygen as initiator at a temperature of 150° C. and a pressure of 1500 atm.; the tube had a length of 720 m., which in the first part of 370 m. length had an inner diameter of 25 mm., and in the second part of 350 m. length, an inner diameter of 32 mm. Through the jacket 36 enclosing the first part of the reaction tube, hot water of a temperature of 220° C. was flowing, whereas the temperature of the water flowing through the jacket 39 of the second part was 210° C.

After 110 m. length of flow, the temperature in the first part of the reaction tube 31 rose above the 220° C. of the hot water in the jacket, this being a definite proof of the start of polymerization. After a flow length of 300 m. the temperature rose to 265° C. and remained at that level up to the length of 370 m. After 370 m. length at the point 35, further 3150 parts ethylene and 0.135 part oxygen having a temperature of 90° C. and a pressure of 1500 atm. were introduced into the reaction tube. Directly after this second introduction of reaction gas, the temperature reached 177° C.; after a flow of 80 m. in the second part of the reaction tube 31, the temperature of the hot water of 210° C. was again exceeded; it rose to 265° C. at a length of the reaction tube 660 m. and that temperature was maintained at about the same level to the end of the reaction tube.

The two reaction mixtures were prepared as follows:

In the mixing vessel 3 in the low-pressure part of the polymerization plant, 1320 parts pure ethylene and 180 parts effluent ethylene were mixed with 0.21 part oxygen per hour at 2 atm. pressure and compressed by the compressor designated by 10 to a pressure of 240 atm. At that pressure, the fresh ethylene was divided by means of the double valve 12, into 535 parts for the reaction gas supply at the inlet 30 of the reaction tube 31, and into 965 parts for the second reaction gas admission at 35 after 370 m. length of flow in the reaction tube; the gas is introduced at a pressure of 240 atm. into mixing vessels 15 and 16. In addition, the mixing vessels are proportionately supplied by residual gas not reacted in the reaction tube 31, over branching means 19, that is: the mixing vessel 15 with 2650 parts, and the mixing vessel 16 with 2150 parts. The quantities of reaction gas supplied to the mixing vessels are automatically determined by the control of the two fresh ethylene streams by means of double valve 12, and the delivery output of the first stage of the compressor 26 separately aspirating after the mixing vessels. The compressor compressed the two streams of reaction gas separately to 1500 atm. Subsequently the gas streams of the first and second gas admission were introduced into the reaction tube at 30 and 35. By the pressure control valve 42, pressure in the reaction mixture is relieved to 240 atm. and passed into the first separator 43, in which 4800 parts of the residual reaction gas separated from the polymer and were again passed proportionately into the two mixing vessels 15 and 16. The polymer was separated at a pressure of 240 atm. and reached the separator 46 over valve 45 with pressure relief to 2 atm.; in the separator 46, 180 more parts of ethylene, dissolved in the polymer, escaped and returned into mixing vessel 3.

Polyethylene was discharged from the second separator 46 and granulated. Obtained were 1320 parts of polyethylene hourly, corresponding to a conversion of 20.9% calculated on the introduced ethylene. The density of the polyethylene is 0.920 g./cm.$^3$, the melt index 2.1 g./10 minutes and the tensile strength 137 kp./m.$^2$. Due to a favorable distribution of molecular weight, the polymer has an excellent transparency and a gloss value of 27%, so that after-processing is unnecessary. On account of these properties, combined with only a low amount of high-molecular inclusions, so-called fisheyes, the material is especially suitable for making foils.

EXAMPLE 2

The tube 31 is the same as described in Example 1. Into the tube, we introduced hourly at the starting point 30, 3015 parts of ethylene, 135 parts of propane, and 0.057 part of oxygen as initiator at a temperature of 130° C. and a pressure of 1900 atm.; after a flow length of 370 m., at point 35, we then introduced 3035 parts ethylene, 115 parts propane and 0.113 part oxygen at a temperature of 80° C. and a pressure of 1900 atm. Water flowing through jacket 36 had a temperature of 215° C., and that flowing through jacket 39 had a temperature of 207° C. In the first part of the reaction tube, after a flow length of 90 m., the temperature in the tube rose above that of the hot water in the jacket, that is above 215° C.; after a flow length of 325 m. the temperature inside the tube was 272° C. and at the length of 370 m. it dropped to 270° C. Due to admission at point 35 of the reaction gas having a temperature of 80° C., the temperature inside the tube dropped to 176° C., after another 70 m. (total distance 440 m.) the temperature rose once more above the hot water temperature of the jacket i.e. 207° C., and at a total length of 690 it reached 274° C., which temperature was maintained to the end of the tube.

The two reaction gas mixtures were prepared as follows:

In the low pressure part of the polymerization plant, after an enrichment in the cycle had taken place of 5% propane, 1700 parts of gas containing 1400 parts pure ethylene, 280 parts effluent ethylene, 20 parts propane (both the effluent ethylene and the propane were obtained from the second separator) and 0.170 part oxygen as initiator are combined at 2 atm. pressure and then compressed by compressor 10 to 290 atm. Under that pressure, the fresh ethylene was divided by double valve 12 into 595 parts to be delivered to point 30 into tube 31, and 1105 parts to be delivered at 35 into the second reaction zone. Both portions were first conveyed at 290 atm. pressure into mixing vessels 15 and 16, respectively. To the mixing vessels unconverted residual reaction gas is also admitted over 19. The propane concentration in the residual gas was 5%, but it was reduced to 4.3 and 4.4%, respectively, in the two streams introduced at 30 and 35, respectively.

By the valve 42 arranged near the end of the reaction tube a pressure relief to 290 atm. was effected in the reaction mixture which was passed to separator 43, in which 4600 parts of residual gas were separated from the polymer and which were proportionately delivered to the two mixing vessels 15 and 16. The polymer, separated at a pressure of 290 atm. was conveyed over valve 45 with pressure relief to 2 atm. and reached separator 46, where another 300 parts of a gas mixture consisting of 280 parts ethylene and 20 parts propane were set free and admitted to the mixing device 3. From the second separator 46 polyethylene was discharged and granulated. Obtained were hourly 1460 parts polyethylene corresponding to a conversion of 24.1% calculated on the ethylene introduced.

The density of the polyethylene was 0.928 g./cm.$^3$, the melt index 1.8 g./min. and the tensile strength 151 kp./cm.$^2$. The polymer was of high transparency and the glass value was 25%, so that no after-processing is necessary. Due to the almost complete absence of high molecular inclusions the materials is very well suited for making fine foils and thin-walled cable sheaths. The withdrawing rate of cables was up to 725–775 m./min.

EXAMPLE 3

Into the tube 31 equipped with jackets 36, 39, and having a length of 950 m. and an inner diameter of 25 mm., we introduced hourly at inlet 30, into the first zone of 370 m. length, 2884 parts ethylene, 266 parts ethane and 0.095 part oxygen at a temperature of 130° C. and a pressure of 1700 atm.; into the second zone of 580 m. length, the gas introduced hourly at inlet 35 after a total length of 370 m. was a mixture of 2924 parts ethylene, 226 parts ethane, and 0.175 part oxygen at a temperature of 60° C. and a pressure of 1700 atm. Both parts of the jacket carried hot water of 210° C. The temperature after 340 m. length of flow rose to 275° C. and remained at that level until the second introduction of reaction gas occurred, dropped after that to 165° C., and rose again toward the end of the reaction tube to 278° C.

The two mixtures of reaction gas were prepared as follows:

In the low-pressure part of the plant, after the ethane had reached a concentration of 10.5% in the cycle, hourly 1800 parts of gas were prepared consisting of 1520 parts pure ethylene and 252 parts effluent ethylene, 28 parts ethane and 0.270 part oxygen and compressed from a pressure of 2 atmospheres to a pressure of 260 atm. The mixture was admitted in the manner described in Example 1.

The mixture for the first reaction zone consisted of 630 parts of fresh ethylene, and 2520 parts of residual reaction gas, that for the second zone of the reaction tube of 1170 fresh ethylene and 1980 parts residual gas. The ethane concentration in the residual gas was 10.5% and was reduced by the fresh ethylene in the first gas stream to 8.5%. In the second reaction gas stream the concentration of ethane was 7.2% and was brought up to 8.5%. After pressure relief had been brought about by the valve 42 to 260 atm., 4750 parts of residual gas were released in the first separator 43 which were supplied to the two mixing vessels over 19, as described, the pressure on polyethylene was relieved to 2 atm. in the second separator 46, where another 252 parts ethylene and 28 parts ethane were set free which were admitted to mixing vessel 3. The polyethylene from the second separator was subsequently subjected to granulation. Obtained were hourly 1520 parts of polyethylene corresponding to a conversion of 26.2% calculated on ethylene used.

The density of the polyethylene was 0.924 g./cm.$^3$, the melt index 8.0 g./10 min. and the tensile strength 95 kp./cm.$^2$. The material is excellently adapted for use in injection molding and for rotational molding.

EXAMPLE 4

In example 4, we used a tube 31 which in this case had a total length of 720 m., a first part of 250 m. with an inner diameter of 25 mm. and a second part of 470 m. length having an inner diameter of 32 mm.; into the first zone we introduced hourly 2835 parts of ethylene, 22.5 parts hydrogen, and 0.095 part oxygen at a temperature of 130° C. and a pressure of 1600 atm.; into the second zone, 2903 parts ethylene, 20.6 parts hydrogen and 0.15 part oxygen were introduced at point 35, at a temperature of 85° C. and a pressure of 1600 atm. Through jackets 36 and 39, water having a temperature of 210° C. was flowing. After a length of flow of 180 m., the temperature rose to 248° C., dropped directly after the second introduction of reaction gas to 165° C. and rose again to 250° C. towards the end of the reaction tube.

The two reaction gas mixtures were prepared as follows:

In the low-pressure part of the polymerization plant, after the concentration of hydrogen had reached 0.97% in the cycle, hourly 1420 parts of gas were prepared consisting of 1200 parts pure ethylene, 219 parts effluent ethylene, 1 part hydrogen and 0.245 part oxygen, and the gas mixture was compressed from a pressure of 2 atm. to a pressure of 260 atm. The introduction of the gas into tube 31 was effected in the manner described in Example 1. The mixture for the first reaction zone consisted of 550 parts of fresh ethylene and 2307.5 parts of residual reaction gas, the mixture for the second zone of 870 parts fresh ethylene and 2053.6 parts residual reaction gas. The hydrogen concentration in the residual gas was 0.97% and was decreased to 0.79% and 0.71% respectively in the two reaction gas streams by the addition of fresh ethylene. After pressure relief to 260 atm. by the pressure regulator valve 42 in separator 43, 4361.1 parts of residual reaction gas was admitted into mixers 15 and 16. Presssure relief to 2 atm. took place for the polyethylene formed in the second separator 46, where again 219 parts of ethylene and one part hydrogen were set free and admitted to mixer 3.

The polyethylene from the second separator was granulated. Obtained were hourly 1200 parts polyethylene, corresponding to a conversion of 21% calculated on ethylene used.

The low-pressure polyethylene has a melting range of 98–102° C. and a density of 0.935 g./cm.$^3$. It is well suited for the use as corrosion protecting substance or as a compounding material in the candle industry.

EXAMPLE 5

Into the first part of a tube as described in Example 1 we introduced hourly 3050 parts of ethylene, 320 parts of vinyl acetate, 0.05 part of oxygen and 0.3 part dilauroyl peroxide, dissolved in 4 parts of paraffin oil, at a temperature of 125° C. and a pressure of 1950 atm.; after a flow length of 370 m., we introduced into the second part at point 35, 3030 parts of ethylene, 350 parts of vinyl acetate, 0.1 part of oxygen and 0.3 part tert.butylperbenzoate dissolved in 5 parts of paraffin oil at a temperature of 90° C., and a pressure of 1950 atm. Through jacket 36, water of 220° C., through jacket 39 water of 210° C. was circulated. After a flow length of 190 m. the temperature in the gas rose to 280° C., dropped directly after the second introduction of gas to 185° C., and rose again to 275° C. towards the end of the reaction tube.

The two reaction gas mixtures were prepared as follows:

In the low-pressure part of the polymerization plant, after concentration of the vinyl acetate in the cycle had reached 10.1%, hourly 1865 parts of ethylene and 0.15 part of oxygen were mixed with fresh ethylene and the gas mixture was compressed from a pressure of 2 atm. to one of 290 atm. The introduction of the gas into tube 31 was effected as described in Example 1. The mixture for the first reaction zone consisted of 622 parts of fresh ethylene, 2701 parts of residual reaction gas and 47 parts of vinyl acetate. The latter were introduced into the reaction gas through line 24 arranged ahead of the suction side of compressor 26. Through line 29, arranged at the pressure side of the compressor, 0.3 part of dilauroyl peroxide dissolved in 4 parts paraffin oil was added to the gas.

The mixture for the second reaction zone consisted of 1243 parts of fresh ethylene, 1989 parts residual reaction gas and 148 parts of vinyl acetate. The latter were introduced ahead of the suction side of the compressor 26 by line 25. Through line 34, arranged at the pressure side of the compressor, 0.3 part tert. butylperbenzoate dissolved in 5 parts of paraffin oil was admitted.

After pressure relief of 290 atm. over the regulator valve, 4960 parts of residual reaction gas were admitted to the mixers 15 and 16. Pressure relief to 2 atm. took place by valve 45 into separator 46 for the polyethylene formed and 160 parts of ethylene were released in said separator which returned to mixer 3.

The polyethylene from the second separator was subsequently granulated; obtained were hourly 1900 parts of polyethylene containing 10.2% vinyl acetate corresponding to a conversion of 28.5% calculated on used ethylene and 29% of vinyl acetate used.

The polymer had a density of 0.934 g./cm.$^3$, a melt index of 4.1 g./10 min. and a tearing strength of 180 kp./cm.$^2$. Due to its low incidence of corrosion upon stress cracking and its high flexibility it is especially useful as cable insulation, special foils and blown articles of high transparency.

EXAMPLE 6

Into the first part of a tube as described in Example 1, we introduced hourly 2360 parts of ethylene, 1060 parts of vinyl acetate, 0.03 part of oxygen and 0.5 part dilauroyl peroxide, dissolved in 10 parts of paraffin oil, at a temperature of 110° C. and a pressure of 2200 atm.; after a length of flow of 370 m., we introduced into the second part at point 35, 2360 parts of ethylene, 1060 parts vinyl acetate, and 0.11 part of oxygen at a temperature of 95° C. and a pressure of 2200 atm. Through both jackets, hot water of 215° C. was flowing. After a length of flow of 180 m. the temperature in the gas rose to 270° C., dropped to 190° C. directly after the second introduction of gas, and rose again to 280° C. towards the end of the reaction tube.

The reaction gas mixtures were prepared as follows:

In the low-pressure part of the polymerization plant, after the concentration of the vinyl acetate had reached 31% in the cycle, hourly 1520 parts of gas were prepared consisting of 1410 parts of pure ethylene, 110 parts effluent ethylene, and 0.14 part oxygen, and the gas mixture was compressed from a pressure of 2 atm. to one of 240 atm. The introduction of the gas into tube 31 was effected as described in Example 1. The mixture for the first reaction zone consisted of 325 parts of fresh ethylene, 2950 parts of residual reaction gas, 145 parts of vinyl acetate and 0.5 part of dilauroyl peroxide, dissolved in 10 parts paraffin oil. The vinyl acetate and the dilauroyl peroxide were introduced into the reaction gas as described in Example 5.

The mixture for the second reaction zone consisted of 1195 parts of fresh ethylene, 1690 parts residual reaction gas and 535 parts of vinyl acetate; the latter were introduced as described in Example 5.

After pressure relief to 240 atm. over the regulator valve, 4640 parts of residual reaction gas were admitted to the mixers 15 and 16. Pressure relief to 2 atm. took place from separator 43 to separator 46 for the polyethylene formed and 110 parts of ethylene were released in said separator which returned to mixer 3.

The polyethylene from the second separator was subsequently granulated; obtained were hourly 2090 parts of polyethylene containing 31.5% vinyl acetate corresponding to a conversion of 29.8% calculated on used ethylene and 32% on vinyl acetate used.

The polymer had a density of 0.953 g./cm.$^3$, a melt index of 510 g./10 min. and a tensile strength of 32 kp./cm.$^2$. It is especially useful as compounding ingredient, especially with paraffins, and for flexible coatings.

What we claim is:

1. In a process for making ethylene polymers and copolymers of ethylene with other polymerizable compounds in a tubular reactor at pressures of at least 1300 atmospheres and temperatures between 100 and 350° C. wherein reaction gas, comprising a mixture of fresh ethylene, oxygen and recycled residual reaction gas, is introduced into the tubular reactor at two different points spaced along the length of the tubular reactor, the improvement comprising combining fresh ethylene gas with the oxygen, dividing the oxygen-containing fresh ethylene gas at a pressure of 100 to 400 atmospheres into two streams, adding recycled residual reaction gas to each of the two streams thereby to convert said streams into reaction gas streams, in a compression zone compressing the two reaction gas streams to at least 1300 atmospheres, introducing into the reactor one of the reaction gas streams at the inlet to the reactor and the other at a point along the reactor and adjusting the proportions into which the oxygen-containing fresh ethylene gas is divided and the output from the compression zone for each of the two gas streams so to effect the distribution of the oxygen-containing fresh ethylene gas and the recycled residual reaction gas that at the inlet of the reactor and directly downof the coreactants in the reactor at the inlet to the reaction gas into the reactor the concentration of oxygen in the reactor is at approximately the same value and in a range of 0.0005 to 0.5% by weight.

2. Process according to claim 1, in which the reaction gas mixture also comprises at least one coreactant of the group consisting of comonomers, chain control agents and solvents and the coreactants are so distributed between the two reaction gas streams that the concentration of the coreactants in the reactor at the inlet to the reactor and directly downstream from the second point of introduction of the reaction gas into the reactor is at approximately the same value and in the range of 0.1 to 60% by weight.

3. Process according to claim 2, in which the coreactants are added to the gas mixture prior to the compression of the gas streams to at least 1300 atmospheres.

4. Process according to claim 3, in which the coreactants are added to the gas mixture prior to the dividing.

5. Process according to claim 2, in wihch the comonomers are of the group consisting of vinyl esters, acrylic esters and acrylic acid, the control agents are of the group consisting of hydrogen, olefins, paraffins, chlorinated hydrocarbons, alcohols, aldehydes and ketones and the solvent is benzene.

6. Process according to claim 1, further comprising adding to the reaction gas streams after compression to at least 1300 atmospheres but prior to their introduction into the reactor at least one initiator other than oxygen.

7. Process according to claim 6, in which the other initiator is a peroxide or an azo compound.

8. Process according to claim 7, in which the other initiator is di-tert-butyl peroxide, dibenzoylperoxide, dilauroylperoxide, isovaleroylperoxide, tert-butylperbenzoate, hydrogen peroxide, azobisisobutylronitrile or 2,2'-dicyanoazobenzene.

References Cited
UNITED STATES PATENTS

| | | | |
|---|---|---|---|
| 2,852,501 | 9/1958 | Richard et al. | 260—94.9 |
| 3,306,889 | 2/1967 | Schoppert | 260—94.9 |
| 3,334,081 | 8/1967 | Modgwick et al. | 260—94.9 |
| 3,405,115 | 10/1968 | Schoppert et al. | 260—94.9 |

JOSEPH L. SCHOFER, Primary Examiner

E. J. SMITH, Assistant Examiner

U.S. Cl. X.R.

260—87.3, 88.1, 94.9

UNITED STATES PATENT OFFICE
CERTIFICATE OF CORRECTION

Patent No. 3,551,397      Dated December 29, 1970

Inventor(s) Manfred RÄTZSCH ET AL

It is certified that error appears in the above-identified patent and that said Letters Patent are hereby corrected as shown below:

In Claim 1, line 56, after "down-" delete "of the coreactan in the reactor at the inlet to" and substitute by --stream from the second point of introduction of--

Signed and sealed this 23rd day of March 1971.

(SEAL)
Attest:

EDWARD M. FLETCHER, JR.
Attesting Officer

WILLIAM E. SCHUYLER, JR
Commissioner of Patents